United States Patent
Seo et al.

(10) Patent No.: US 9,783,194 B2
(45) Date of Patent: Oct. 10, 2017

(54) AUTONOMOUS DRIVING SYSTEM AND METHOD IN PARKING LOT

(71) Applicant: HYUNDAI MOTOR COMPANY, Seoul (KR)

(72) Inventors: Min Wook Seo, Suwon-si (KR); Sung Yun Kim, Seoul (KR); Gil Won Seo, Hwaseong-si (KR); Bong Chul Ko, Hwaseong-si (KR); Joo Woong Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/936,032

(22) Filed: Nov. 9, 2015

(65) Prior Publication Data
US 2017/0008515 A1    Jan. 12, 2017

(30) Foreign Application Priority Data
Jul. 8, 2015    (KR) .................... 10-2015-0097388

(51) Int. Cl.
| | | |
|---|---|---|
| *G01C 22/00* | (2006.01) | |
| *G05D 1/00* | (2006.01) | |
| *B60W 30/06* | (2006.01) | |
| *B60W 10/18* | (2012.01) | |
| *B60W 10/20* | (2006.01) | |
| *B60W 10/04* | (2006.01) | |
| *B60W 10/10* | (2012.01) | |
| *G01C 21/20* | (2006.01) | |
| *G08G 1/14* | (2006.01) | |

(52) U.S. Cl.
CPC ............ *B60W 30/06* (2013.01); *B60W 10/04* (2013.01); *B60W 10/10* (2013.01); *B60W 10/18* (2013.01); *B60W 10/20* (2013.01); *G01C 21/20* (2013.01); *G05D 1/0088* (2013.01); *G08G 1/143* (2013.01); *G08G 1/146* (2013.01); *B60W 2550/00* (2013.01); *B60W 2710/10* (2013.01); *B60W 2710/18* (2013.01); *B60W 2710/20* (2013.01); *B60W 2720/10* (2013.01); *B60W 2900/00* (2013.01)

(58) Field of Classification Search
CPC ...... B60W 10/04; B60W 10/10; B60W 10/18; B60W 10/20; G01C 21/26; G05D 1/0088; G08G 1/14
USPC .......................................................... 701/25
See application file for complete search history.

(56) References Cited

U.S. PATENT DOCUMENTS

| | | | | |
|---|---|---|---|---|
| 2010/0161128 A1* | 6/2010 | Choi | ........................ | E04H 6/422 700/258 |
| 2014/0368636 A1* | 12/2014 | Lee | .................... | B62D 15/0285 348/118 |

FOREIGN PATENT DOCUMENTS

| | | | |
|---|---|---|---|
| JP | 2007-326415 A | | 12/2007 |
| KR | 10-2010-0073078 A | | 7/2010 |

(Continued)

*Primary Examiner* — Maceeh Anwari
(74) *Attorney, Agent, or Firm* — Brinks Gilson & Lione (57) ABSTRACT

The present disclosure provides an autonomous driving system and method in a parking lot. In particular, the autonomous driving system includes: a parking lot server to transmit parking lot information including parking lot map data to which a virtual lane is applied to a vehicle entering the parking lot when the vehicle entering the parking lot is sensed; and an autonomous driving apparatus to perform autonomous driving of the vehicle up to any one parking slot empty in the parking lot using the virtual lane.

13 Claims, 9 Drawing Sheets

(56) References Cited

FOREIGN PATENT DOCUMENTS

| | | |
|---|---|---|
| KR | 10-2011-0062439 | 6/2011 |
| KR | 10-2011-0105124 | 9/2011 |
| KR | 10-2012-0058022 A | 6/2012 |
| KR | 10-2013-0118116 A | 10/2013 |
| KR | 10-2014-0133332 A | 11/2014 |
| KR | 10-2015-0019083 A | 2/2015 |

\* cited by examiner

AUTONOMOUS DRIVING SYSTEM AND METHOD IN PARKING LOT

CROSS-REFERENCE TO RELATED APPLICATION

This application claims the benefit of the Korean Patent Application No. 10-2015-0097388, filed on Jul. 8, 2015, which is incorporated herein by reference in its entirety.

FIELD

The present disclosure relates to an autonomous driving system and method of a vehicle.

BACKGROUND

The statements in this section merely provide background information related to the present disclosure and may not constitute prior art.

An autonomous driving vehicle indicates a vehicle driven up to a destination by oneself by recognizing a surrounding environment without driver's intervention and deciding a driving situation to control the vehicle.

In the case in which the autonomous driving vehicle is driven on a general road in which lanes are clearly distinguished from each other (for example, a first lane, a second lane, and the like), the autonomous driving vehicle may smoothly perform obstacle avoidance driving through a lane change. However, it is difficult for the autonomous driving vehicle to safely perform autonomous driving in the case in which lanes are not distinguished from each other as in a driving road or in a parking lot, and a width of a driving road is narrow due to a spatial limitation.

SUMMARY

The present disclosure provides an autonomous driving system and method capable of safely performing autonomous driving of a vehicle up to a parking slot using a virtual lane, for example, in the parking lot.

According to an exemplary form of the present disclosure, an autonomous driving system in a parking lot includes: a parking lot server configured to transmit parking lot information including parking lot map data to which a virtual lane is applied to a vehicle entering the parking lot when the vehicle entering the parking lot is sensed; and an autonomous driving apparatus configured to perform autonomous driving of the vehicle up to any one parking slot empty in the parking lot using the virtual lane.

The parking lot server may configure a virtual central line on a driving road of the parking lot map data.

The central line may be a driving line of the virtual lane.

The parking lot server may configure central lines of virtual lanes each spaced apart from the central line by a predetermined distance in both directions perpendicular to the central line in consideration of right turn or left turn of the vehicle.

The parking lot server may include: a vehicle entering sensing unit configured to be installed at an entrance of the parking lot to sense the vehicle entering the parking lot; a wireless communicating unit configured to perform wireless communication with the autonomous driving apparatus provided in the vehicle; a map storing unit configured to store the parking lot map data therein; and a processing unit configured to transmit the parking lot information including the parking lot map data to the vehicle entering the parking lot through the wireless communicating unit when the vehicle entering the parking lot is sensed through the vehicle entering sensing unit.

The processing unit may designate a parking slot in which the vehicle is to be parked, plan a path up to the designated parking slot, and transmit the planed path to the autonomous driving apparatus.

The processing unit may plan a driving path up to a parking slot selected by a user and provide the planed driving path to the autonomous driving apparatus.

The processing unit may reconfigure an interval of the virtual lane on the basis of information on the vehicle.

According to another exemplary form of the present disclosure, an autonomous driving apparatus includes: a wireless communicating unit configured to be connected to a parking lot server through wireless communication when a vehicle enters a parking lot and receive parking lot information provided by the parking lot server; a controlling unit configured to control autonomous driving of the vehicle up to a parking slot in which the vehicle is to be parked on the basis of the parking lot information; and a vehicle controlling unit configured to control an actuator of the vehicle depending on the control of the controlling unit, wherein the parking lot information includes parking lot map data to which a virtual lane is applied and state information of each parking slot in a parking lot, and the controlling unit performs autonomous driving of the vehicle along the virtual lane.

The autonomous driving apparatus may further include a sensor unit sensing an obstacle positioned in the vicinity of the vehicle.

The sensor unit may include any one or more of radar, laser, ultrasonic, and image sensors.

The parking lot information may further include information on a parking slot allocated to the vehicle and a driving path up to the parking slot allocated to the vehicle.

According to still another exemplary form of the present disclosure, an autonomous driving method in a parking lot includes: a parking lot server sensing a vehicle entering the parking lot; the parking lot server transmitting parking lot information including parking lot map data to which a virtual lane is applied to the vehicle entering the parking lot when the parking lot server senses the vehicle entering the parking lot; and an autonomous driving apparatus of the vehicle performing autonomous driving of the vehicle up to a parking slot in which the vehicle is to be parked using the virtual lane.

The performing of the autonomous driving may include: the autonomous driving apparatus transmitting information on a parking slot selected by a user on the parking lot map data to the parking lot server; the parking lot server designating the selected parking slot as a parking slot of the vehicle; the parking lot server generating a driving path up to the selected parking slot and transmitting the generated driving path to the autonomous driving apparatus; and the autonomous driving apparatus performing the autonomous driving of the vehicle along a virtual lane of the driving path.

The performing of the autonomous driving may include: the parking lot server designating a parking slot of the vehicle; the parking lot server generating a driving path up to the designated parking slot; the parking lot server transmitting the driving path to the autonomous driving apparatus of the vehicle; and the autonomous driving apparatus performing the autonomous driving of the vehicle along a virtual lane of the driving path.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a parking lot map to which a virtual lane is applied to a vehicle entering a parking lot to allow the vehicle entering the parking lot to be autonomously driven up to a parking slot in which the vehicle is to be parked using the virtual lane.

Figure 1:
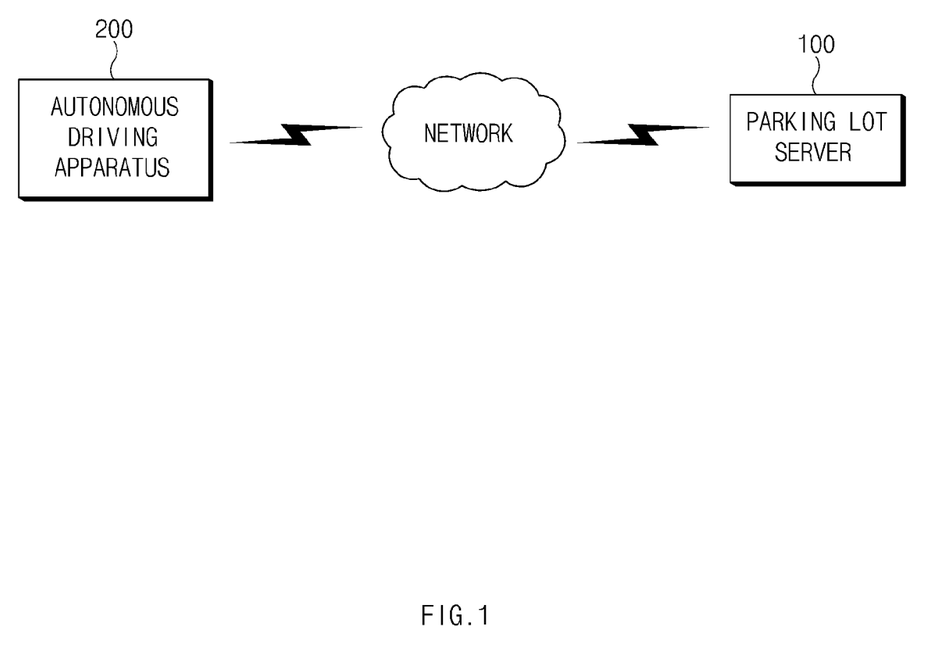
FIG. 1 is a view illustrating an autonomous driving system in a parking lot.

FIG. 1 is a view illustrating an autonomous driving system in a parking lot according to an exemplary form of the present disclosure.

As illustrated in FIG. 1, the autonomous driving system is configured to include a parking lot server 100 and an autonomous driving apparatus 200 provided in a vehicle. The parking lot server 100 and the autonomous driving apparatus 200 transmit and receive data therebetween through wireless communication. The parking lot server 100 and the autonomous driving apparatus 200 may transmit and receive the data therebetween through a network, as illustrated in FIG. 1, or transmit and receive the data directly therebetween.

The parking lot server 100 senses that the vehicle including the autonomous driving apparatus 200 enters the parking lot when the vehicle enters the parking lot, and provides parking lot information to the autonomous driving apparatus 200 of the vehicle entering the parking lot. The parking lot information includes any one or more of parking lot map data, a parking-enabled slot (e.g., an empty parking slot), and a driving path up to the parking-enabled slot. Here, the parking lot map data are a map to which a virtual lane for autonomous driving of the vehicle is applied.

The parking lot server 100 may communicate with the autonomous driving apparatus 200 of the vehicle entering the parking lot to obtain information (for example, a kind of vehicles kind, sizes of vehicles, and the like) on the corresponding vehicle, reconfigure a virtual lane modified for the vehicle entering the parking lot on the basis of the obtained information on the vehicle, and provide the reconfigured virtual lane.

The autonomous driving apparatus 200 controls autonomous driving of the vehicle up to a parking slot in which the vehicle is to be parked on the basis of the parking lot information provided by the parking lot server 100 at the time of entering the parking lot. The autonomous driving apparatus 200 is driven using the virtual lane in the parking lot map data included in the parking lot information. The virtual lane is displayed as a central line of a driving lane in the parking lot map data. That is, the vehicle moves along the central line of the driving lane depending on a control of the autonomous driving apparatus 200.

Next, a method of configuring a plurality of virtual lanes by the parking lot server 100 will be described.

The parking lot server 100 configures a central line on a road on which the vehicle may be driven in the parking lot map data. This central line corresponds to a central line of a central lane.

The parking lot server 100 configures each of the lanes (driving lines) spaced apart from the central line by a predetermined distance in both directions perpendicular to the central line in consideration of right turn or left turn of the vehicle. For example, the parking lot server 100 generates each of a central line of a left lane and a central line of a right lane in relation to the central line of the central lane.

Here, the parking lot server 100 configures intervals and positions of central lines (driving line) of a cornering entering lane and a cornering exiting lane in consideration of a maximum rotation radius of the vehicle in each lane. The maximum rotation radius of the vehicle may be represented by the following Equation 1 based on an instantaneous center of rotation (ICR):

$$R = \frac{L}{\tan\phi} \qquad \text{[Equation 1]}$$

Here, R is a rotation radius of the vehicle, L is a distance from a front wheel of the vehicle to a rear wheel of the vehicle, and φ is a steering angle.

In addition, at the time of configuring a left driving line and a right driving line, a margin slot is secured so that a contact between vehicles that are normally parked and a driven vehicle is not generated. Further, since rotation radii are different from each other depending on kinds of vehicles, an interval of a lane is reconfigured depending on the kinds of vehicles.

The parking lot server 100 configures a driving line for parking slot precision search in a direction perpendicular to the parking slot.

The parking lot server 100 has a map data on specific points configuring a central line (driving line) of each lane to utilize the corresponding map data at the time of autonomous driving. Here, the specific points include a position, a lane, a speed, a direction, a main driving road, a sub driving road, an exiting road, an entering road, an intersection road, and the like.

Figure 2:
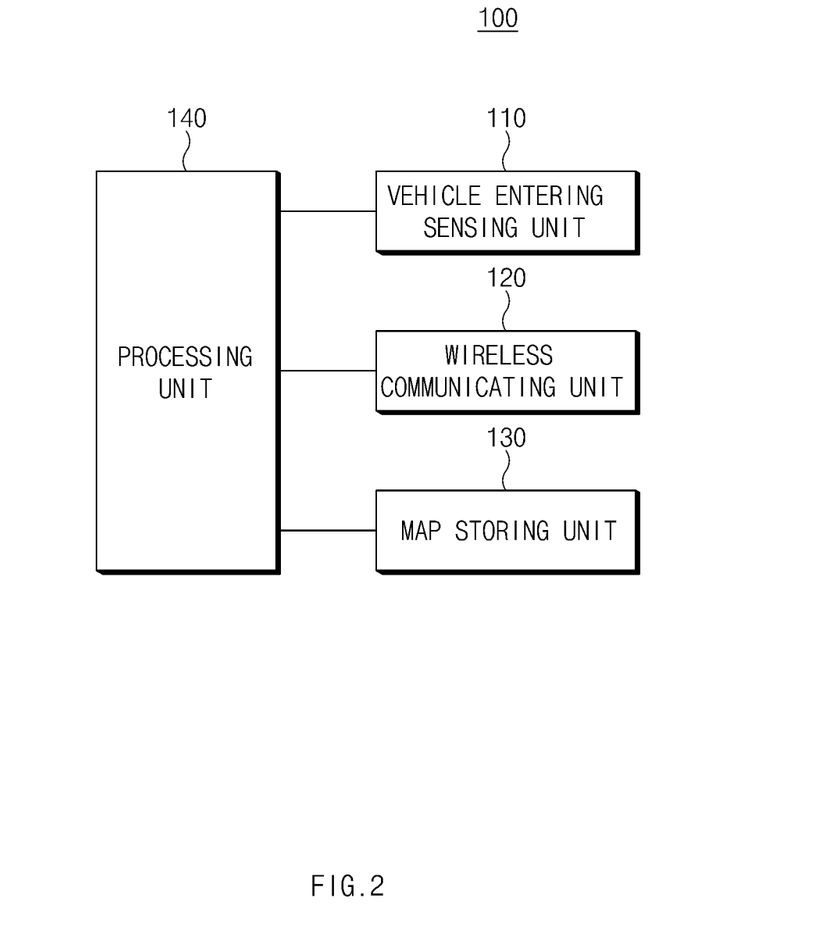
FIG. 2 is a block diagram illustrating a parking lot server.

FIG. 2 is a block diagram illustrating a parking lot server according to an exemplary form of the present disclosure.

As illustrated in FIG. 2, the parking lot server 100 is configured to include a vehicle entering sensing unit 110, a wireless communicating unit 120, a map storing unit 130, and a processing unit 140.

The vehicle entering sensing unit 110 is installed at an entrance of the parking lot to sense a vehicle entering the parking lot. The vehicle entering sensing unit 110 may include one or more of sensors such as a radar sensor, a laser sensor, an ultrasonic sensor, an image sensor, and the like. In other words, the vehicle entering sensing unit 110 distinguishes the vehicle from other objects to sense the vehicle.

The wireless communicating unit 120 enables wireless communication with the autonomous driving apparatus 200 provided in the vehicle. The wireless communicating unit 120 may use any one of wireless Internet, near field communication, and mobile communication.

The map storing unit 130 stores the parking lot map data therein. Here, the parking lot map data includes information on the virtual lanes.

The processing unit 140 transmits the parking lot map data stored in the map storing unit 130 to the vehicle entering the parking lot through the wireless communicating unit 120 when the vehicle entering the parking lot is sensed through the vehicle entering sensing unit 110.

The processing unit 140 manages information on the parking slots in the parking lot. The processing unit 140 collects state information (the parking slots are empty, the vehicles are parked in the parking slot, under construction, and the like) of the parking slots through sensors installed in each parking slot. In addition, the processing unit 140 manages each of the number and positions of parking slots in which the vehicles may be parked (parking-enabled slots) in the parking lot. The parking lot server 100 may include a storing means (not illustrated) for storing management information on the parking slots in the parking lot therein.

The processing unit 140 designates (allocates) a parking slot in which the vehicle entering the parking lot is to be parked or assigns a parking slot selected by a user. Here, in the case in which the number of party vehicles of the vehicle entering the parking lot is one or more, the processing unit 140 assigns parking slots of the respective vehicles so that the respective vehicles may be parked adjacently to the party vehicles.

Figure 3:
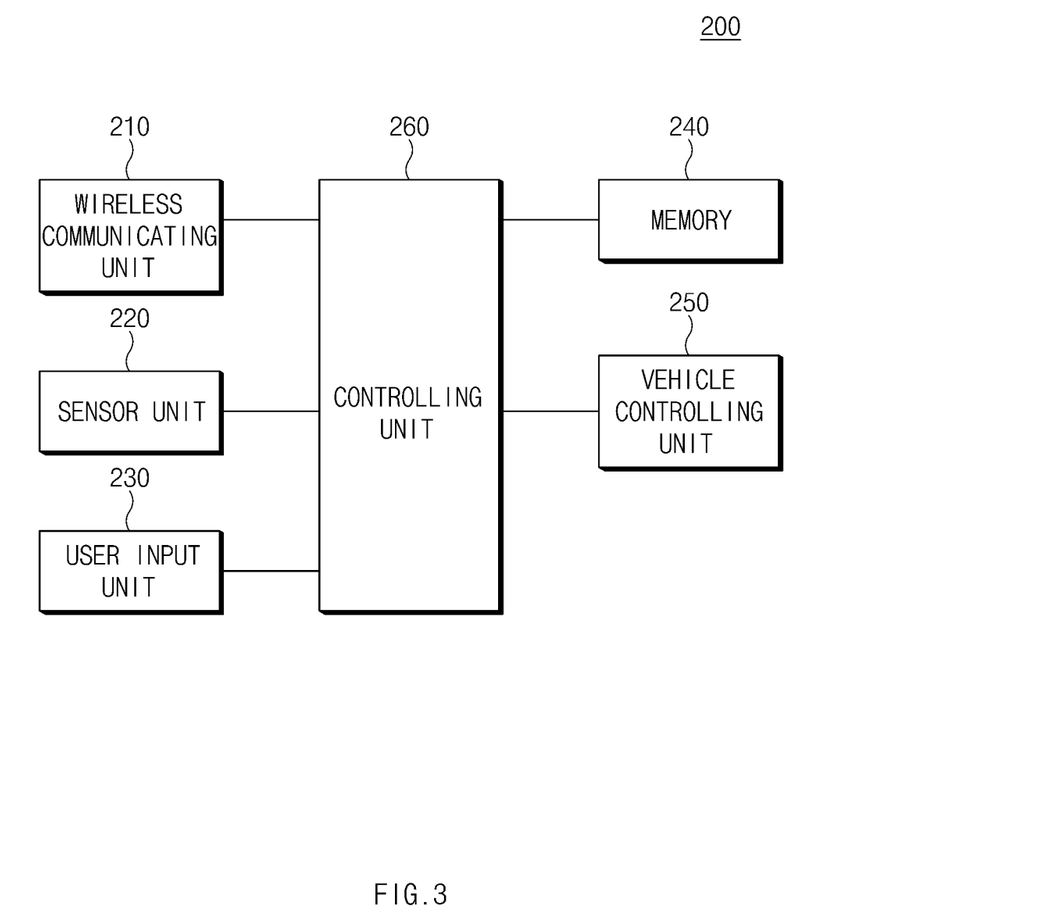
FIG. 3 is a block diagram illustrating an autonomous driving apparatus.

FIG. 3 is a block diagram illustrating an autonomous driving apparatus according to an exemplary form of the present disclosure.

As illustrated in FIG. 3, the autonomous driving apparatus 200 is configured to include a wireless communicating unit 210, a sensor unit 220, a user input unit 230, a memory 240, a vehicle controlling unit 250, and a controlling unit 260.

The wireless communicating unit 210 performs wireless communication with the parking lot server 100. The wireless communicating unit 210 uses any one of wireless Internet, near field communication, and mobile communication.

The sensor unit 220 senses an obstacle and measures a position of the vehicle. The sensor unit 220 includes radar, laser, ultrasonic, and image sensors, a global positioning system (GPS) receiving module, and the like.

The user input unit 230 receives data and control commands input from the user. The user input unit 230 may be implemented by any one of input means such as a key pad, a touch pad, a touch screen, and the like.

Various programs required for an autonomous driving control of the autonomous driving apparatus 200 and data generated depending on an operation are stored in the memory 240.

In addition, the parking lot information received through the wireless communicating unit 210 is stored in the memory 240.

The vehicle controlling unit 250 controls an actuator of the vehicle to perform any one of deceleration, acceleration, braking, and shifting of the vehicle. The vehicle controlling unit 250 includes a steering controller, a braking controller, an acceleration controller, a gear controller, and the like.

The controlling unit 260 controls a general operation of the autonomous driving apparatus 200, and controls the vehicle controlling unit 250 on the basis of the parking lot information provided from the parking lot server 100 to perform the autonomous driving.

The controlling unit 260 connects communication with the parking lot server 100 through the wireless communicating unit 210 when the vehicle enters the parking lot. In addition, the controlling unit 260 displays the parking lot map data provided from the parking lot server 100 on a display (not illustrated). Here, the controlling unit 260 maps state information on each parking slot to the parking lot map data and displays the parking lot map data to which the state information on each parking slot is The controlling unit 260 selects any one of parking slots displayed on the display on the basis of the data input from the user input unit 230. In addition, the controlling unit 260 transmits information on the selected parking slot to the parking lot server 100 through the wireless communicating unit 210.

Further, the controlling unit 260 may designate the number of party vehicles depending on a user input from the user input unit 230. The controlling unit 260 transmits information on the number of party vehicles to the parking lot server 100 and requests the parking lot server 100 to assign parking slots so that the party vehicles (group vehicles) may be parked at adjacent positions.

The controlling unit 260 maps a driving path up to a parking slot designated by the parking lot server 100 to the parking lot map data and displays the parking lot map data to which the driving path is mapped on the display (not illustrated), and performs autonomous driving along a virtual lane on the driving path. Here, the virtual lane is displayed as a line at the center of a lane.

When an obstacle in the vicinity of the vehicle is sensed through the sensor unit 220, the controlling unit 260 induces a lane change to perform obstacle avoidance driving. Here, the controlling unit 260 stops the vehicle in the case in which the obstacle avoidance driving cannot be performed.

Although the case in which the parking lot server 100 plans (generates) the driving path has been described by way of example in the above-mentioned exemplary forms, the present disclosure is not limited thereto, but may also be implemented so that the autonomous driving apparatus 200 of the vehicle plans the driving path.

Figure 4:
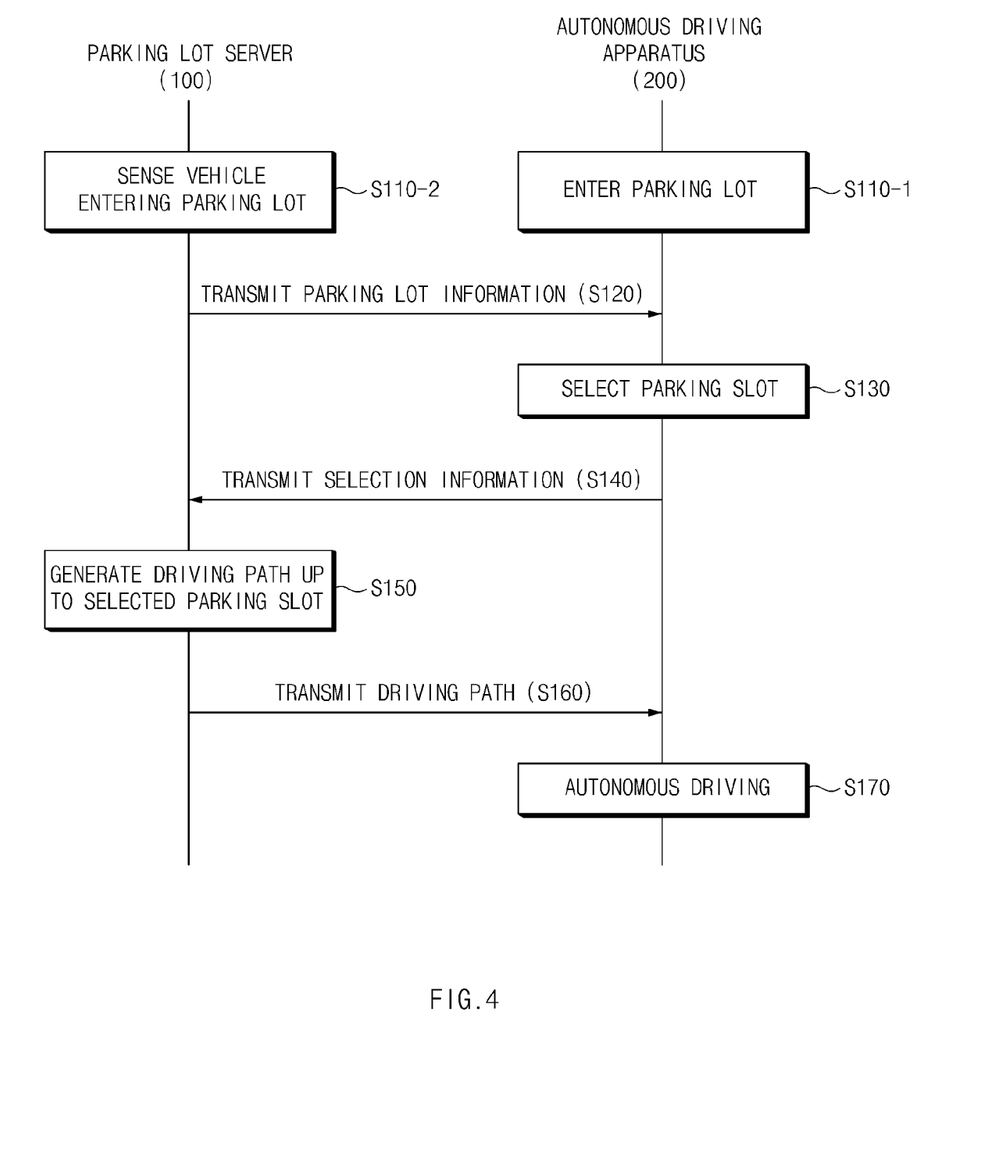
FIG. 4 is a flow chart illustrating an autonomous driving method in a parking lot.

FIG. 4 is a flow chart illustrating an autonomous driving method in a parking lot according to an exemplary form of the present disclosure.

As illustrated in FIG. 4, when the vehicle enters the parking lot (S110-1), the parking lot server 100 senses the vehicle entering the parking lot through the vehicle entering sensing unit 110 (S110-2). Here, the parking lot server 100 connects the communication with the autonomous driving apparatus 200 of the vehicle and collects the information on the vehicle. Here, the information on the vehicle includes a kind, a size, and the like, of the vehicle.

The parking lot server 100 transmits the parking lot information to the vehicle entering the parking lot (S120) when the vehicle entering the parking lot is sensed. Here, the parking lot information includes a parking lot map data to which virtual lanes are applied and information on parking-enabled slots (empty parking slots).

The autonomous driving apparatus 200 in the vehicle entering the parking lot confirms the parking lot information and selects a parking slot in which the vehicle is to be parked on the basis of the parking lot information (S130). In other words, the autonomous driving apparatus 200 displays the parking lot map data on a display screen, and maps the parking-enabled slots onto the parking lot map data and displays the parking lot map data onto which the parking-enabled slots are mapped. The user selects any one of the parking-enabled slots displayed on the display screen.

The autonomous driving apparatus 200 transmits information on the parking-enabled slot selected by the user to the parking lot server 100 through the wireless communicating unit 210 (S140). The autonomous driving apparatus 200 transmits position information (coordinate, allocation number, or the like) of the parking-enabled slot selected by the user.

When the parking lot server 100 receives the information on the selected parking slot transmitted from the autonomous driving apparatus 200, the parking lot server 100 generates (plans) a driving path up to the corresponding parking slot (S150). Here, the parking lot server 100 may reconfigure a virtual lane on the parking lot map data on the basis of the received information of the vehicle.

The parking lot server 100 transmits the generated driving path to the autonomous driving apparatus 200 through the wireless communicating unit 120 (S160).

The autonomous driving apparatus 200 maps the received driving path to the parking lot map data and displays the parking lot map data to which the received driving path is mapped on the display screen, and performs the autonomous driving using the virtual lane on the driving path (S170).

Although the case in which the parking lot server 100 obtains the information of the vehicle through the communication with the autonomous driving apparatus 200 of the vehicle has been disclosed in the above-mentioned exemplary form, the present disclosure is not limited thereto, but may also be implemented so that the parking lot server 100 obtains the information on the vehicle such as a kind of vehicle, a size of the vehicle, and the like, using sensors.

Figure 5:
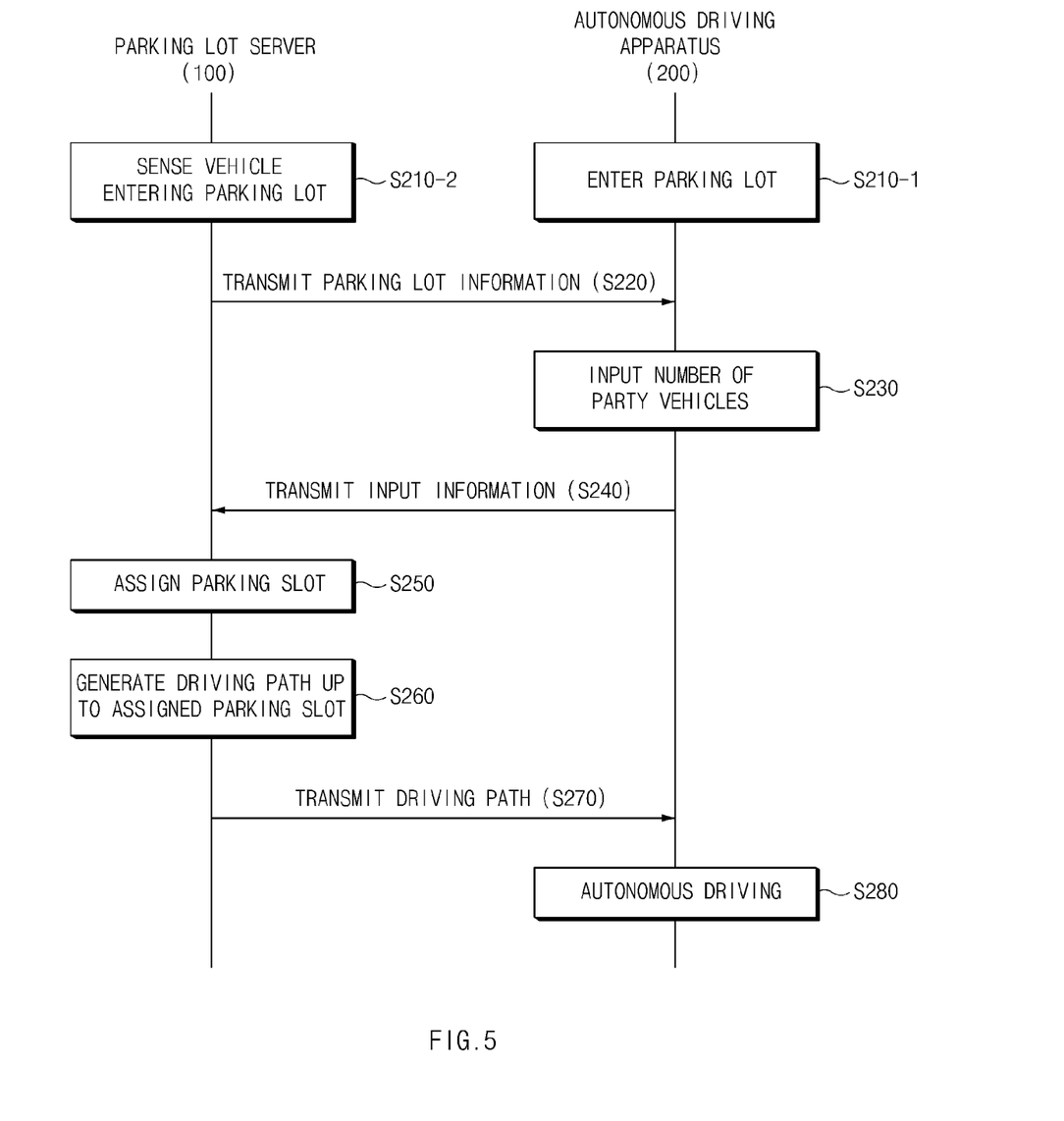
FIG. 5 is a flow chart illustrating an autonomous driving method in a parking lot.

FIG. 5 is a flow chart illustrating an autonomous driving method in a parking lot according to another exemplary form of the present disclosure.

First, when the vehicle including the autonomous driving apparatus 200 enters the parking lot (S210-1), the parking lot server 100 senses the vehicle entering the parking lot through the vehicle entering sensing unit 110 (S210-2).

When the parking lot server 100 senses the vehicle entering the parking lot, the parking lot server 100 transmits the parking lot information stored in the map storing unit 130 to the vehicle entering the parking lot (S220).

When the autonomous driving apparatus 200 of the vehicle entering the parking lot receives the parking lot information provided by the parking lot server 100 through the wireless communicating unit 210, the autonomous driving apparatus 200 receives the number of party vehicles input from the user through the user input unit 230 (S230).

The autonomous driving apparatus 200 transmits information on the number of party vehicles input by the user to the parking lot server 100 through the wireless communicating unit 210 (S240).

The parking lot server 100 assigns a parking slot in which the vehicle is to be parked among parking-enabled slots in the parking lot on the basis of the received information on the number of party vehicles (S250). In other words, the parking lot server 100 assigns the parking slot so that the party vehicles may be parked adjacently to each other.

The parking lot server 100 generates (plans) a driving path up to the assigned parking slot (S260).

The parking lot server 100 transmits the generated driving path through the wireless communicating unit 120 (S270).

The autonomous driving apparatus 200 in the vehicle receives the driving path and performs the autonomous driving along a virtual lane on the received driving path (S280).

Figure 6:
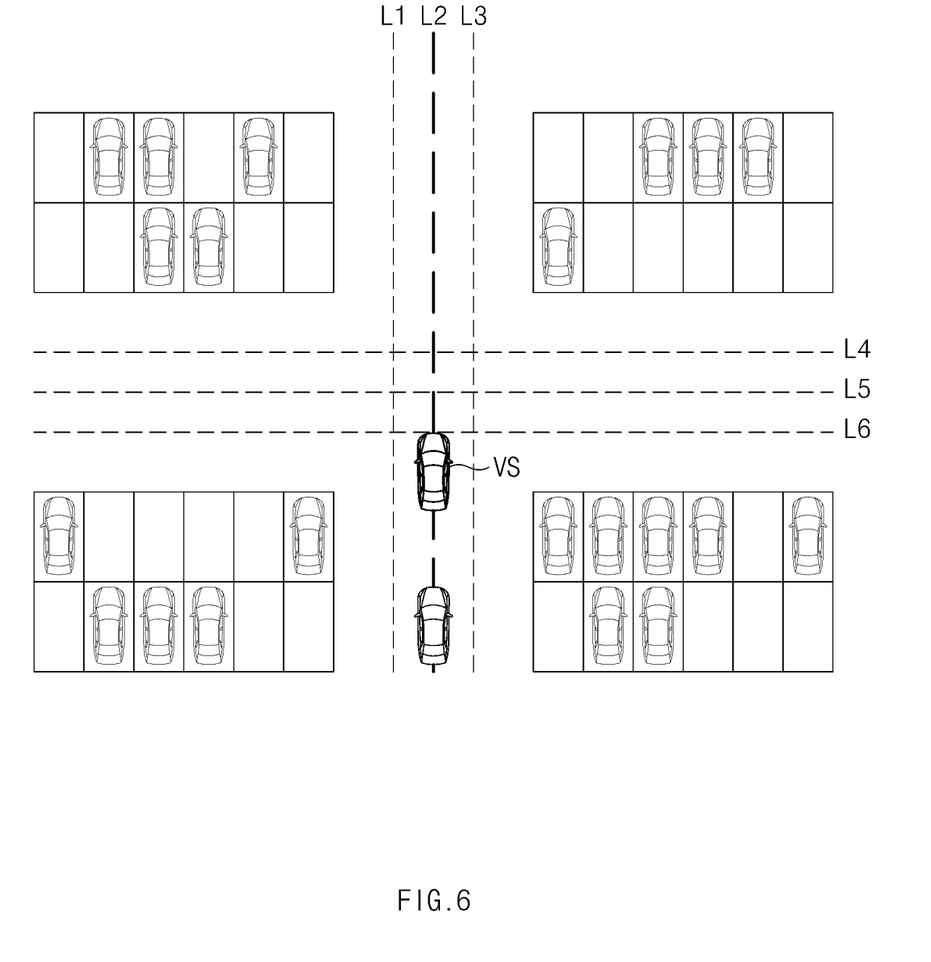
FIG. 6 is a view for describing general driving according to the present disclosure.

FIG. 6 is a view for describing general driving according to the present disclosure.

When a vehicle VS enters the parking lot, the autonomous driving apparatus 200 included in the vehicle VS receives the parking lot information from the parking lot server 100. In addition, the autonomous driving apparatus 200 performs autonomous driving along a driving line L2 of a virtual lane (central lane) displayed on the parking lot map data included in the parking lot information. Here, the center of the vehicle VS is positioned on the driving line L2.

Figure 7:
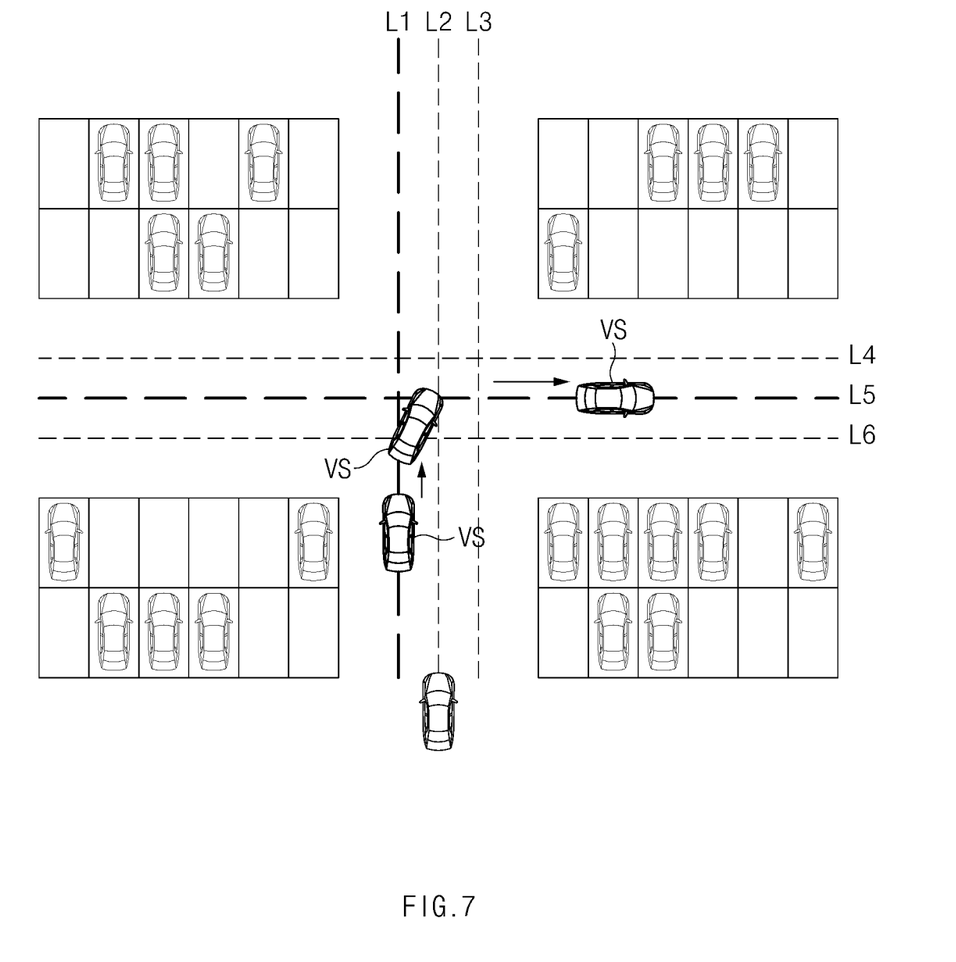
FIG. 7 is a view for describing cornering according to the present disclosure.

FIG. 7 is a view for describing cornering according to the present disclosure.

In the case in which the vehicle VS needs to perform cornering, the autonomous driving apparatus 200 of the vehicle VS induces a lane change into a driving line positioned at an end in an opposite direction to a cornering direction before entering cornering. For example, in the case in which the vehicle VS needs to make a right turn, the autonomous driving apparatus 200 in the vehicle VS performs a lane change from a driving line L2 of a central lane into a driving line L1 of a left lane positioned at a left end.

In addition, the autonomous driving apparatus 200 performs autonomous driving along a central line L5 of a central lane after cornering of the vehicle VS.

Figure 8:
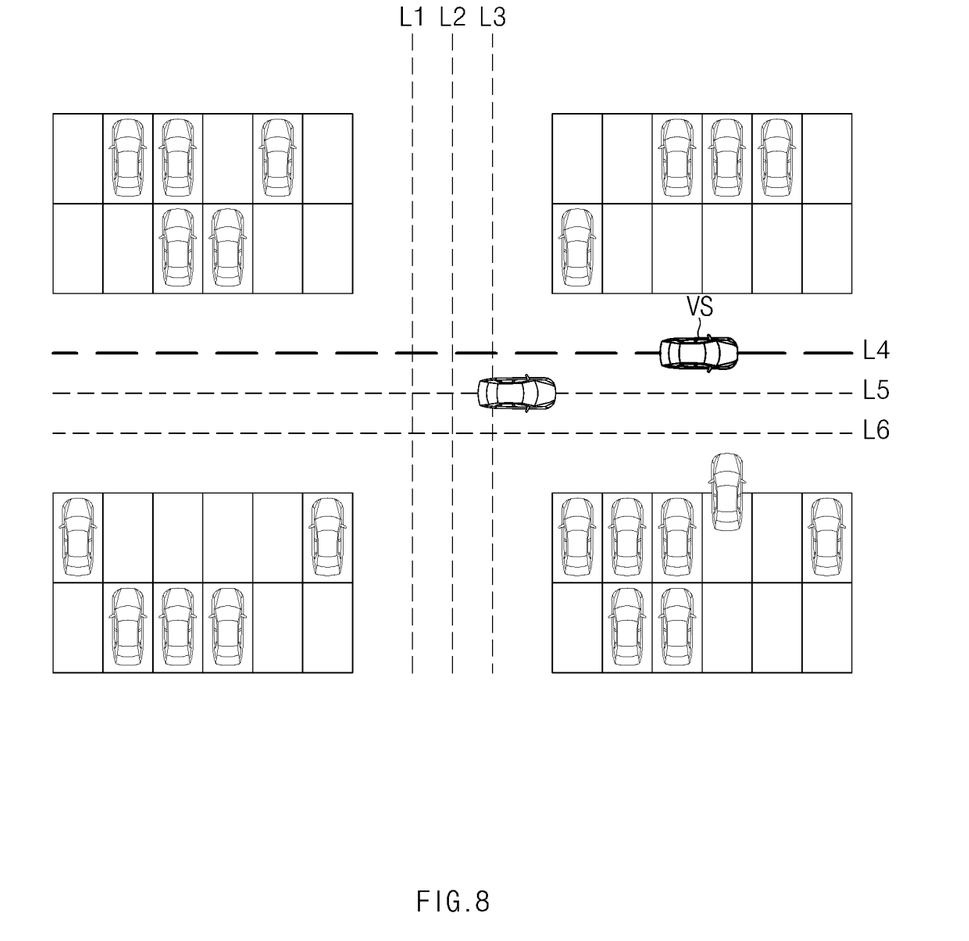
FIG. 8 is a view for describing obstacle avoidance driving according to the present disclosure.

FIG. 8 is a view for describing obstacle avoidance driving according to the present disclosure.

In the case in which the vehicle VS senses an obstacle positioned in the vicinity thereof through the sensor unit 220 while being autonomously driven, the autonomous driving apparatus 200 induces a lane change into an opposite direction to a direction in which the obstacle is positioned in relation to the vehicle VS.

For example, when the vehicle VS senses a vehicle parked out of a parking slot in front thereof while being driven along a driving line L5 of a central lane, the autonomous driving apparatus 200 changes a lane from the driving line L5 into a driving line L4 to perform obstacle avoidance driving.

Figure 9:
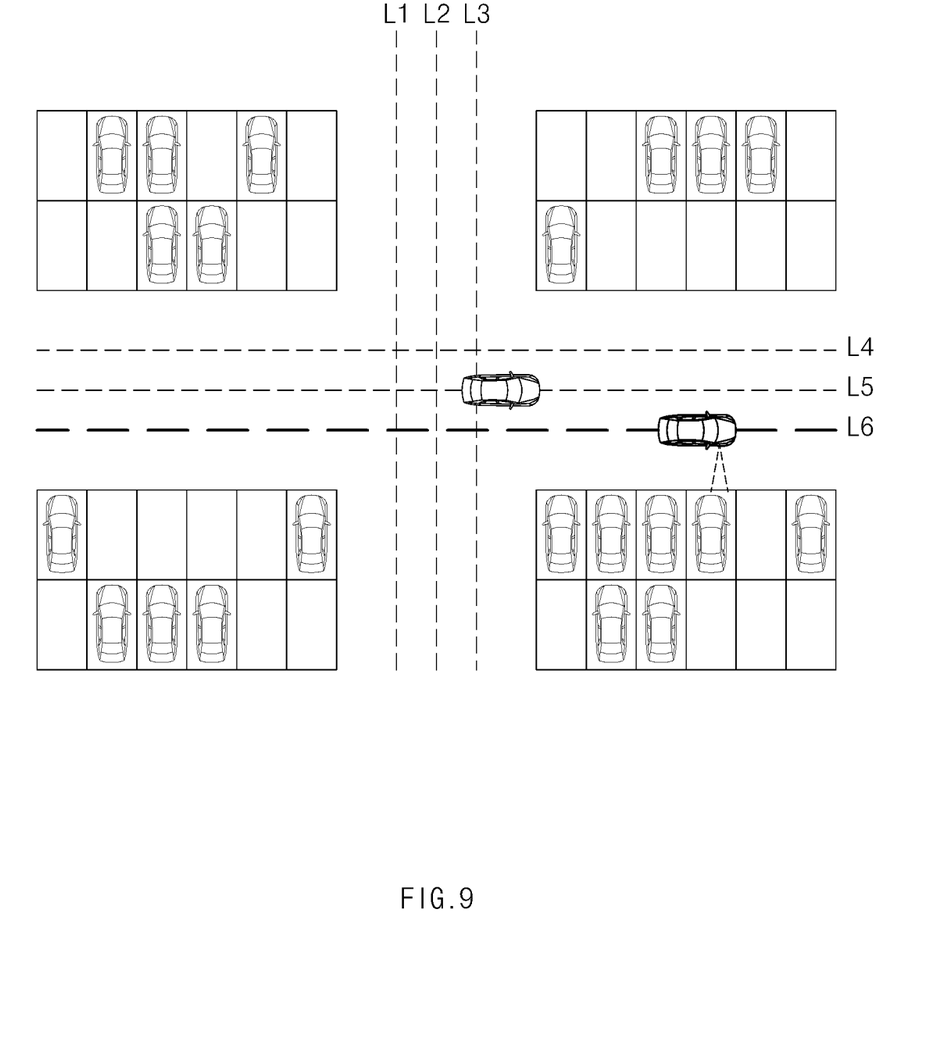
FIG. 9 is a view for describing parking slot precise search according to the present disclosure.

FIG. 9 is a view for describing parking slot precise search according to the present disclosure.

When the vehicle VS approaches a parking slot designated from the parking lot server 100, the autonomous driving apparatus 200 performs parking slot precise search. Here, the autonomous driving apparatus 200 induces a lane change into a direction in which the designated parking slot is positioned.

For example, when the vehicle VS approaches the parking slot designated to the vehicle VS while being autonomously driven along a driving line L5, the autonomous driving apparatus 200 confirms a position of the designated parking slot and performs a lane change into a driving line L6 positioned in a direction in which the corresponding parking slot is positioned.

Although the case in which the parking slot precise search is performed when the vehicle approaches the parking slot designated by the parking lot server 100 has been described by way of example in the above-mentioned exemplary form, the present disclosure is not limited thereto, but may be variously modified.

For example, in the case in which the parking lot server 100 does not assign the parking slot in which the vehicle VS is to be parked, the autonomous driving apparatus 200 may also perform autonomous driving along a virtual driving line displayed on the parking lot map data and search an empty parking slot.

As described above, according to exemplary forms of the present disclosure, since the vehicle is autonomously driven up to the slot in which it is to be parked using the virtual lane in the parking lot, the obstacle avoidance driving may be smoothly performed, and the cornering may be stably performed.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous driving system in a parking lot, comprising:
    a parking lot server configured to transmit parking lot information including parking lot map data to which a virtual lane is applied to a vehicle entering the parking lot when the vehicle entering the parking lot is sensed; and
    an autonomous driving apparatus configured to perform autonomous driving of the vehicle up to an empty parking slot in the parking lot using the virtual lane,
    wherein the parking lot server is configured to generate a virtual central line for a driving road of the parking lot map data, and
    wherein the parking lot server is configured to generate central lines of virtual lanes, and each central line of the virtual lanes is spaced apart from the virtual central line by a predetermined distance in both directions perpendicular to the virtual central line in consideration of a rotation radius of a right turn or a left turn of the vehicle.

2. The autonomous driving system according to claim 1, wherein the parking lot server comprises:
    a vehicle entering sensing unit configured to be installed at an entrance of the parking lot to sense the vehicle entering the parking lot;
    a wireless communicating unit configured to perform wireless communication with the autonomous driving apparatus provided in the vehicle;
    a map storing unit configured to store the parking lot map data therein; and
    a processing unit configured to transmit the parking lot information including the parking lot map data to the vehicle entering the parking lot through the wireless communicating unit when the vehicle entering the parking lot is sensed through the vehicle entering sensing unit.

3. The autonomous driving system according to claim 2, wherein the processing unit designates a parking slot in which the vehicle is to be parked, plans a path up to the designated parking slot, and transmits the planed path to the autonomous driving apparatus.

4. The autonomous driving system according to claim 2, wherein the processing unit plans a driving path up to a parking slot selected by a user and provides the planed driving path to the autonomous driving apparatus.

5. The autonomous driving system according to claim 4, wherein the processing unit reconfigures an interval of the virtual lane based on an information of the vehicle.

6. An autonomous driving apparatus comprising:
    a wireless communicating unit configured to be connected to a parking lot server through wireless communication when a vehicle enters a parking lot and receive parking lot information provided by the parking lot server;
    a controlling unit configured to control autonomous driving of the vehicle up to a parking slot in which the vehicle is to be parked based on the parking lot information; and
    a vehicle controlling unit configured to control an actuator of the vehicle depending on a control of the controlling unit,
    wherein the parking lot information includes parking lot map data to which a virtual lane is applied and a state information of each parking slot in a parking lot, and the controlling unit performs autonomous driving of the vehicle along the virtual lane,
    wherein the parking lot server is configured to generate a virtual central line for a driving road of the parking lot map data, and
    wherein the parking lot server is configured to generate central lines of virtual lanes, and each central line of the virtual lanes is spaced apart from the virtual central line by a predetermined distance in both directions perpendicular to the virtual central line in consideration of a rotation radius of a right turn or a left turn of the vehicle.

7. The autonomous driving apparatus according to claim 6, further comprising a sensor unit configured to sense an obstacle positioned in a vicinity of the vehicle.

8. The autonomous driving apparatus according to claim 7, wherein when the obstacle positioned in the vicinity of the vehicle is sensed, the controlling unit induces a lane change to perform an obstacle avoidance driving.

9. The autonomous driving apparatus according to claim 7, wherein the sensor unit includes at least one of radar, laser, ultrasonic, or image sensors.

10. The autonomous driving apparatus according to claim 6, wherein the parking lot information further includes information of a parking slot allocated to the vehicle and a driving path up to the parking slot allocated to the vehicle.

11. An autonomous driving method in a parking lot, comprising:
    sensing a vehicle entering the parking lot by a parking lot server, the parking lot server transmitting parking lot information including parking lot map data to which a virtual lane is applied to the vehicle entering the parking lot when the parking lot server senses the vehicle entering the parking lot; and
    performing autonomous driving of the vehicle, by an autonomous driving apparatus of the vehicle, up to a parking slot in which the vehicle is to be parked using the virtual lane,
    wherein the parking lot server is configured to generate a virtual central line on a driving road of the parking lot map data, and
    wherein the parking lot server is configured to generate central lines of virtual lanes, and each central line of the virtual lanes is spaced apart from the virtual central line by a predetermined distance in both directions perpendicular to the virtual central line in consideration of a rotation radius of a right turn or a left turn of the vehicle.

12. The autonomous driving method according to claim 11, wherein the method further comprises:
transmitting, by the autonomous driving apparatus, information of a parking slot selected by a user on the parking lot map data to the parking lot server;
designating by the parking lot server the selected parking slot as a parking slot of the vehicle;
generating a driving path, by the parking lot server, up to the selected parking slot and transmitting the generated driving path to the autonomous driving apparatus; and
performing by the autonomous driving apparatus the autonomous driving of the vehicle along a virtual lane of the driving path.

13. The autonomous driving method according to claim 11, wherein the method further comprises:
designating a parking slot of the vehicle by the parking lot server;
generating a driving path, by the parking lot server, up to the designated parking slot;
transmitting by the parking lot server the driving path to the autonomous driving apparatus of the vehicle; and
performing by the autonomous driving apparatus the autonomous driving of the vehicle along a virtual lane of the driving path.

\* \* \* \* \*